United States Patent [19]
Weiss

[11] 3,837,241
[45] Sept. 24, 1974

[54] PROCESS FOR COLD FORMING A SAW CHAIN CUTTER LINK

[75] Inventor: Werner Weiss, Burlington, Ontario, Canada

[73] Assignee: Sabre Saw Chain (1963) Ltd., Burlington, Ontario, Canada

[22] Filed: Oct. 11, 1972

[21] Appl. No.: 299,610

[52] U.S. Cl. .................................. 76/112, 72/403
[51] Int. Cl. ............................................ B23d 63/00
[58] Field of Search ............ 72/379, 403, 470, 475; 76/112, 101 R, 101 SM, 104

[56] References Cited
UNITED STATES PATENTS

| | | | |
|---|---|---|---|
| 3,154,972 | 11/1964 | Neumeier | 76/112 |
| 3,380,496 | 4/1968 | Hill | 76/112 |
| 3,696,692 | 10/1972 | Baranowski | 76/112 |
| 3,759,079 | 9/1973 | Nowak | 72/330 |

Primary Examiner—Charles W. Lanham
Assistant Examiner—Gene P. Crosby
Attorney, Agent, or Firm—Schuyler, Birch, Swindler McKie & Beckett

[57] ABSTRACT

A process is disclosed for cold forming saw chain cutter links from steel strip in continuous operation in a single progressive die comprising punching and cutting the steel strip to form flat blanks corresponding to the desired cutters, clamping the body portion of each blank between first and second opposing clamping members adapted for reciprocable motion laterally with respect to the blank with the shank and toe portion of the blank extending outwardly from between the clamping members, deflecting the shank portion by striking it against a first anvil surface disposed laterally adjacent the shank portion, and wiping the metal of the toe portion of the blank along a second anvil surface substantially perpendicular to the body portion of the blank adjacent the first anvil surface with a carbide wiping block.

29 Claims, 13 Drawing Figures

PROCESS FOR COLD FORMING A SAW CHAIN CUTTER LINK

DESCRIPTION OF THE PRIOR ART

Saw chain cutter links of the chipper type have conventionally been manufactured by stamping operations wherein a preformed blank is bent to form a C-shaped cutter thereon. While such operations produce the cutters in an inexpensive manner, the essentially bending nature of the stamping operation leaves the outer surface of the cutter under very high tension which detrimentally affects the fatigue and impact strength of the cutter. Also, the chipper configuration is an inherently less efficient cutting shape than a semichisel configuration because of the great length of the cutting edge resulting from the large radius of curvature. However, the more efficient semichisel configurations can not be produced by conventional stamping methods because the sharp corner between the shank and toe portions required to form a semichisel configuration can not be formed by bending without producing cutters having unacceptably low strength in the vertex between the shank and toe due to metal fatigue from the sharp bend.

Consequently, semichisel cutters have been formed by various combinations of bending and grinding operations. While grinding makes it possible to reduce the angle of bending and somewhat increase the fatigue strength of the cutters, it adds a great deal to the cost of manufacture. In addition to the disadvantages of cost, grinding also detrimentally affects the strength of the cutters formed thereby due to the removal of metal and interruption of the material grain flow of the cutters. These problems have been particularly acute with respect to semichisel cutters where a chamfer is ground onto the vertex of the cutter.

FIG. 1 shows a prior art chamfer type semichisel cutter produced by conventional bending and grinding. The toe of the cutter is bent to a lesser angle than the final top plate angle and then reduced by grinding to the final angle. The outer material in the shank and vertex regions is likewise ground away to form a flat shank and a flat chamfer. It can readily be seen that the outer regions of the shank and vertex are under tension due to the bending and that the material grain flow is interrupted by the grinding. The resulting cutter is expensive to produce and has less than optimum strength properties.

There has also been developed a process, disclosed in Neumeier U.S. Pat. No. 3,154,972, for producing chisel and semichisel cutters by cold forming. The patented process involves stamping a preformed blank in a first die to bend the toe to about one-half its final angle, transferring the partially formed cutter to a second die, upsetting the toe by striking a blow thereto substantially parallel to the plane of the body portion of the cutter to further bend the toe and increase the thickness of the vertex region, and grinding the toe of the cutter to the final top plate angle. The Neumeier process is expensive because of the necessity of carrying out two separate forming operations plus a final grinding operation. Further the cutting efficiency of cutters formed by the Neumeier process suffers because of the resistance forces resulting from the increased vertex thickness.

OBJECTS OF THE INVENTION

Accordingly it is the object of this invention to provide a process for economically producing a saw chain cutter having superior cutting efficiency and fatigue and impact strength.

It is another object of this invention to provide a process for producing a saw chain cutter having uninterrupted material grain flow.

It is another object of this invention to provide a process for producing a saw chain cutter which eliminates the need for grinding the top plate of the cutter.

It is another object of this invention to provide a process for producing a saw chain cutter which minimizes the material tension at the outer surface of the cutter.

It is another object of this invention to provide a process for economically producing a saw chain cutter which introduces compressive stress at the outer surface of the cutter.

It is another object of this invention to provide a process for economically producing a saw chain cutter have relatively sharp interior corner between the shank and toe.

It is also an object of this invention to provide a process for producing a saw chain cutter which can be carried out in a continuous operation in a single progressive die.

SUMMARY OF THE INVENTION

These and other objects of the invention are achieved by providing a process for cold forming a saw chain cutter link having a flat body, a laterally offset shank and a generally perpendicular toe comprising the steps of: producing a preformed flat metal blank comprising body, shank and toe portions generally corresponding to the body, shank and toe of the cutter to be formed; clamping the body portion of the blank between movable clamping members with the shank and toe portions protruding from therebetween; deflecting the shank portion out of the plane of the body portion by striking the shank portion against a first anvil surface disposed laterally adjacent thereto; said first anvil surface corresponding to the desired contour of the shank in the cutter being formed; and wiping the toe portion of the blank along a second anvil surface disposed adjacent said first surface, said second surface lying substantially perpendicular to the plane of the body portion.

DETAILED DESCRIPTION OF THE INVENTION

Figure 2:
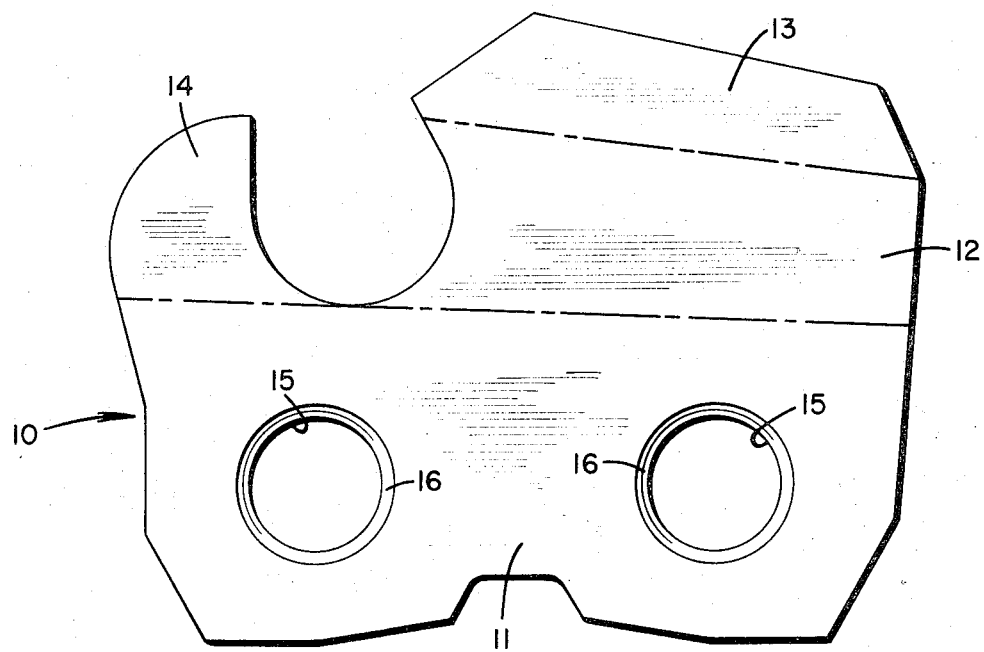
FIG. 2 is a plan view of a progressively developed blank for use in the process of the invention.

FIG. 2 shows a blank 10 adapted to be shaped into a saw chain cutter link according to the process of the invention. Blank 10 comprises body, shank and toe portions 11, 12 and 13 respectively and a depth gauge portion 14 disposed at the forward part of the blank. The amount of metal in the blank corresponds to the amount of metal in the cutter to be formed. Body portion 11 is provided with a pair of spaced apertures 15 which serve to receive locator pins in the die and which later function as rivet holes when the completed cutter links are assembled into chain. The edges of holes 15 are beveled at 16 to receive the expanded rivet heads. Blank 10 is preferably formed by passing steel strip of suitable dimension through a progressive die in a straight sided press which also carrys out the subsequent forming of the blank into a cutter link. A conventional press of 40 ton capacity is readily capable of carrying out the entire operation from start to finish. The strip used in manufacturing the illustrative embodiments described in this specification was cold rolled steel approximately 1⅛ in. wide and .058 in. thick. With each reciprocation of the progressive die, the strip advances stepwise through successive stations where it is flattened, clamped, punched, croped and cut in a conventional manner to form the flat metal blanks as shown in FIG. 2.

Figure 3:
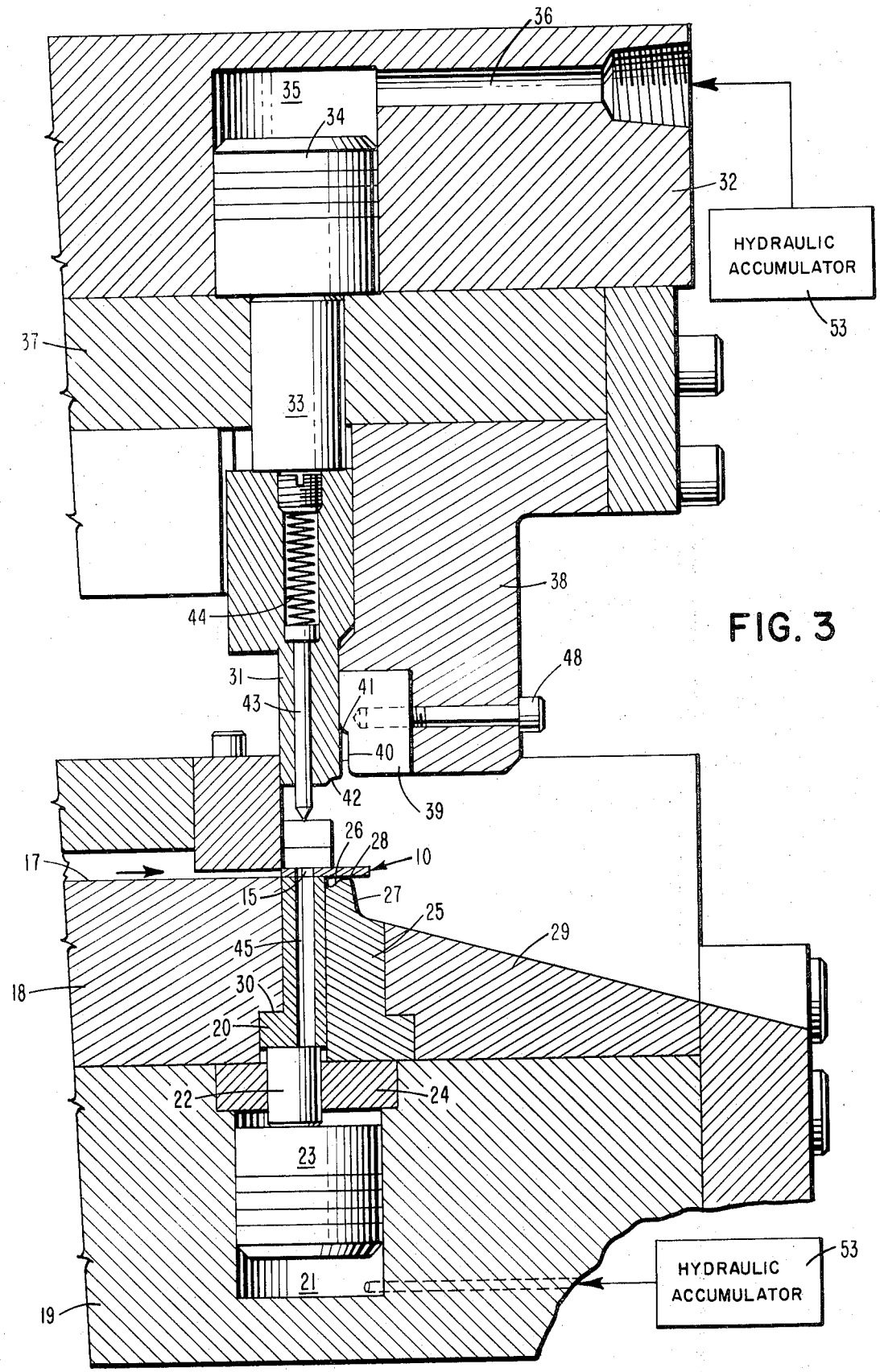
FIG. 3 is a sectional view of the final portion of a progressive die adapted to carry out the process of the invention showing the die in open position.

Turning now to FIG. 3, there is shown in open position the final portion of the progressive die where the above described blanks are formed into cutter links according to the invention. After being formed as described above, a blank 10 advances through the die along surface 17 of support member 18 until the body portion reaches a position on top of a first clamp member 20. Support member 18 rests directly on the platen 19 of the press. Clamp member 20 is mounted for reciprocable motion on a shaft 22 which extends through hard plate 24 to piston 23 in cavity 21. Cavity 21 is connected by means not shown to a hydraulic accumulator 53 which supplies pressure whereby piston 23 and the associated clamp member 20 are urged upwardly until the clamp member contacts stop 30 on support member 18 and the upper surface of clamp member 20 is even with support surface 17.

The shank and toe portions of the blank protrude outwardly and overhang anvil 25 which is disposed on platen 19 and hard plate 24 and is held in position adjacent lower clamp member 20 by support block 29. Anvil 25 is formed with a first anvil surface 26, corresponding to the desired inner contour of the shank in the cutter being formed, disposed adjacent the shank portion of blank 10. A second anvil surface 27 is formed on anvil 25 adjacent first surface 26, substantially perpendicular to the plane of the body portion of the blank. Anvil surfaces 26 and 27 are smoothly joined at the anvil corner 28 which, in the preferred embodiment, is a circular arc of small radius.

Directly above the first clamp member 20 is an opposing, second clamp member 31. Clamp member 31 is mounted on the plunger 32 of the die of the press for reciprocable motion toward clamp member 20 by means of shaft 33 which extends through a plate 37 to a piston 34 in cavity 35 in the plunger. Hydraulic fluid is applied under pressure through passageway 36 to cavity 35 from a hydraulic accumulator 53 so that piston 34 and the associated clamp member 31 are urged downwardly toward first clamp member 20. A greater pressure is applied to clamp member 31 than to clamp member 20.

The difference in pressure or force applied to the first and second clamping members facilitates movement of the clamping members with the blank therebetween laterally with respect to the blank in order to strike the shank portion of the blank against the first anvil surface by providing for collapse of the clamping members in a controlled sequence as the die is closed. In order that the shank of the cutter be properly formed as described hereinafter, this difference in force should be at least about 1000 lb. In the preferred embodiment the force applied to first clamping member 20 is 2000 lb. and the force applied to second clamping member 31 is double that amount or 4000 lb.; thereby yielding a difference in force of 2000 lb. This relationship has been found to provide consistently uniform forming of the cutters. Obviously, numerous other pressure relationships should also provide suitable results.

Figure 11:
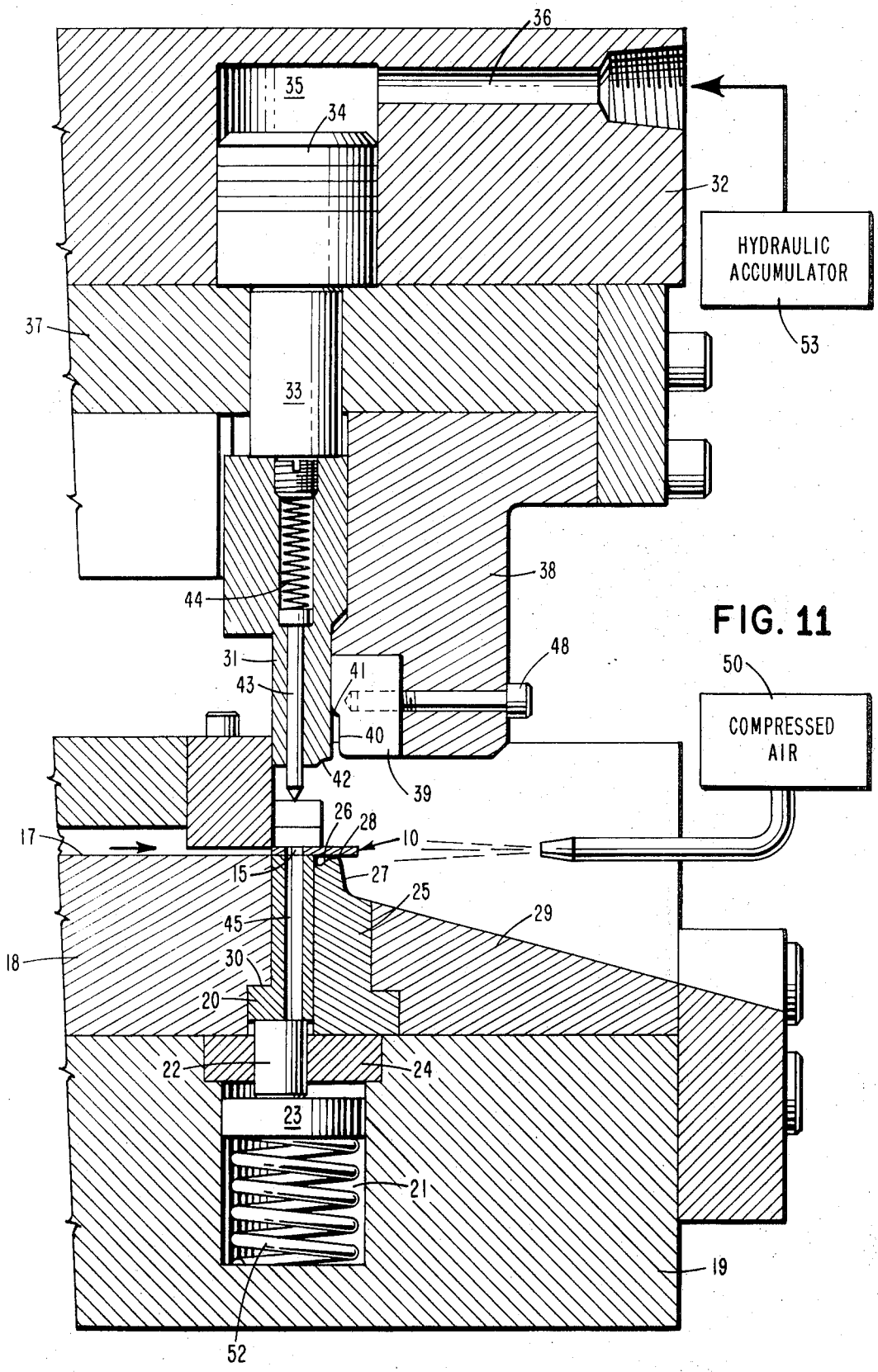
FIG. 11 is a sectional view corresponding to FIGS. 3–7 of a modification of a progressive die adapted to carry out the process of the invention.

As an alternative means for urging the clamping members toward each other, strong compression springs may be substituted for one or both of the hydraulic accumulators to apply pressure to pistons 23 and 34. Highly satisfactory cutters have been produced in test apparatus illustrated in FIG. 11 where a compression spring 52 is utilized to urge first clamp member 20 toward the limit of its extension.

Also mounted against plate 37 on plunger 32 is a wiper support block 38. The corner of support block 38 remote from plunger 32 and adjacent second clamp member 31 is formed to receive a carbide wiper block 39 which is fastened to the support block by bolt 40. Formed on wiper block 39, laterally spaced from clamp member 31, is a wiping surface 40 lying generally perpendicular to the plane of the body portion of the blank. In the preferred embodiment, wiper surface 40 terminates in a striking surface 41 which lies at an angle with respect to the plane of the body portion of the blank and extends from wiping surface 40 to clamp member 31. A pair of locator pins 43, only one of which is shown, are disposed within clamp member 31 and protrude downwardly therefrom. The locator pins are arranged to pass through the holes 15 in blank 10 and be received in a pair of complementary passages 45, only one of which is shown, in the first clamp member 20. Each of the locator pins 43 is adapted to retract into upper clamp member 31 and is urged toward its extended position by a compression spring 44. This arrangement prevents the full force of the press from being applied to the pins should they fail to seat properly as the die is closed.

In the preferred embodiment the second clamp member 31 is somewhat wider than first clamp member 20 and has at the lower end thereof adjacent wiper block 39 a forming surface 42. Forming surface 42 corresponds to the desired configuration of the outer portion of the shank in the cutter link to be formed and is adapted to cooperate with the first anvil surface 26.

Figure 4:
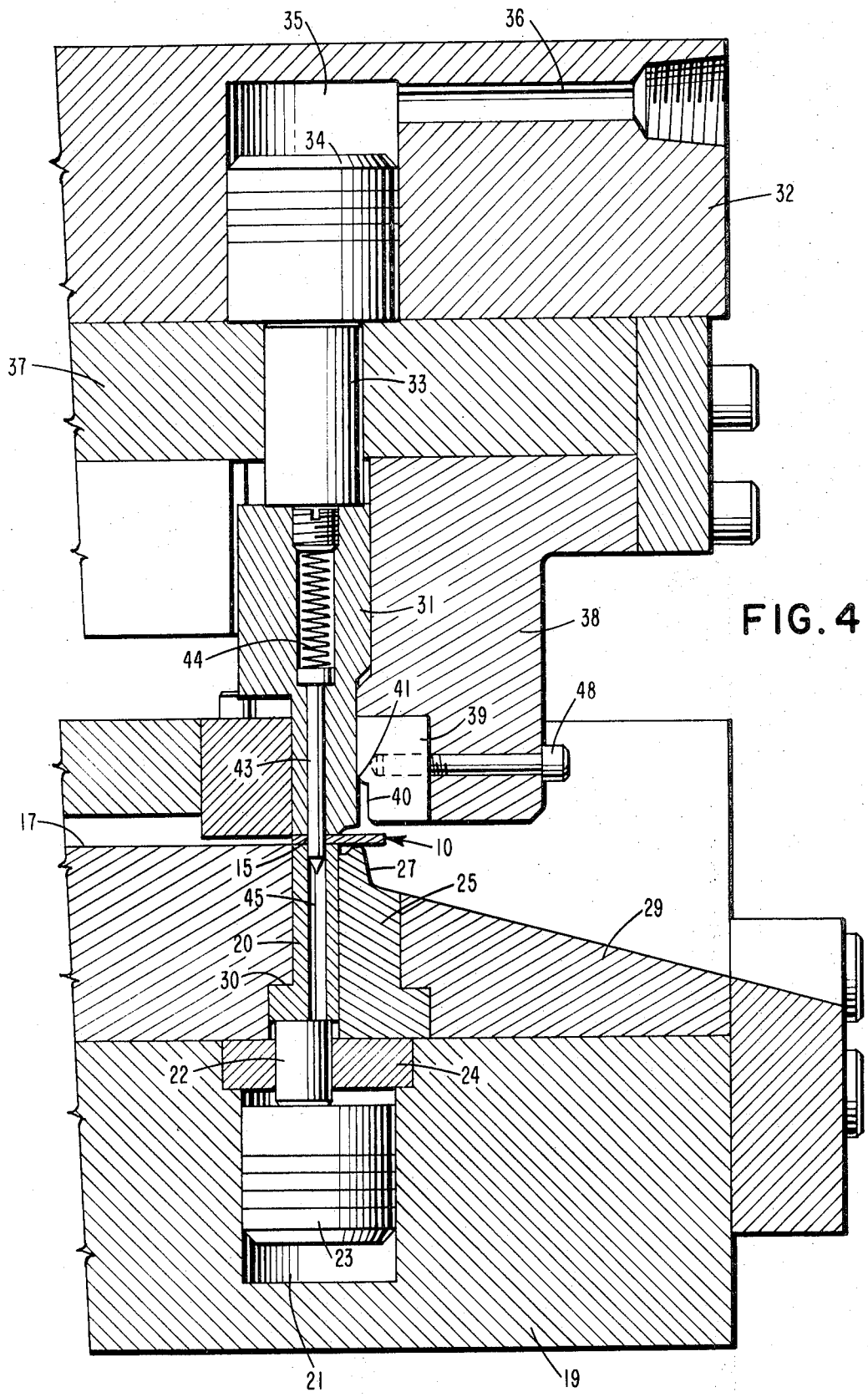
FIG. 4 is a sectional view corresponding to FIG. 3 showing the movable clamp members of the die portion in closed position.

FIG. 4 shows the portion of the die illustrated in FIG. 3 with the clamp members closed. Hydraulic pressure is applied to pistons 23 and 34 causing each of the clamp members 20 and 31 to be extended toward the other to the limit of its movement. Pressure is then applied to the plunger 32 of the press die so that the plunger approaches the platen 19 until the locator pins 43 pass through holes 15 in blank 10 and are received in the passages 45, and the first and second clamp member close on the body portion of blank 10. Blank 10 is then securely clamped in position for forming.

Figure 5:
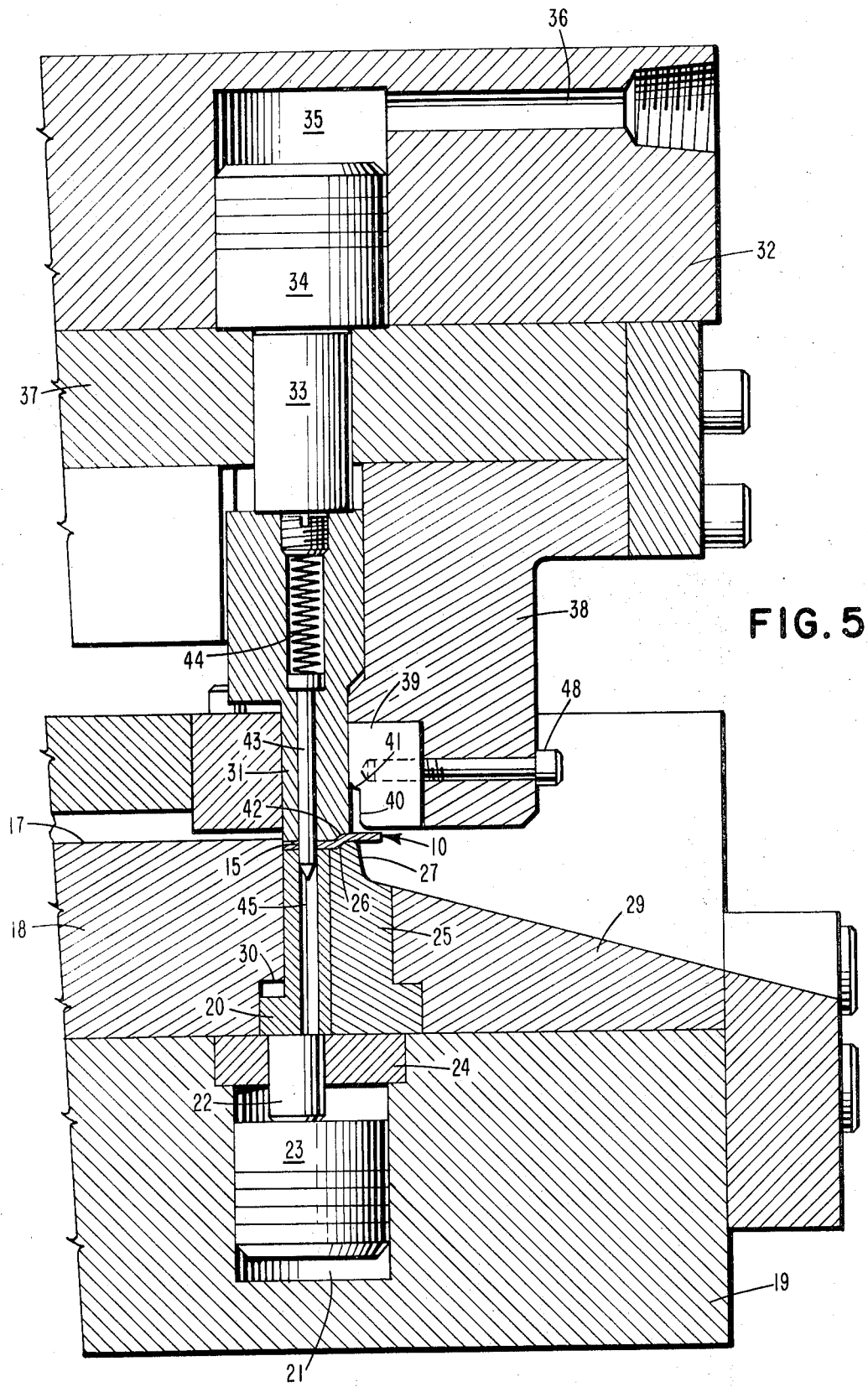
FIG. 5 is a sectional view corresponding to FIG. 3 and 4 showing the lower clamp member in collapsed position.

FIG. 5 shows the die of FIGS. 3 and 4 with the lower clamp member collapsed and the shank of the cutter formed. The build-up of pressure urging the plunger 32 toward platen 19 is continued until that pressure exceeds the 2000 lbs. of force urging lower member 20 toward its extended position. The lower clamp member then collapses under pressure from the plunger transmitted through the clamp member 31 until clamp member 20 bottoms out on hard plate 24 and the upper surface of member 20 is contiguous with the adjacent edge of first anvil surface 26. Blank 10 remains securely clamped between the first and second clamp members due to the 2000 lbs. of force still urging the second clamp member 20 upwardly. As the clamp member 31 moves downwardly and the clamp member 20 collapses, the shank portion of blank 10 is struck against the first anvil surface 26 of anvil 25 and is deflected out of the plane of the body portion of the blank and against surface 42. First anvil surface 26 and forming surface 42 cooperate to form the shank of the cutter. If desired, the spacing between these surfaces may be made slightly less than the thickness of the stock material from which blank 10 was formed so that as pressure from the press builds up between the surfaces, a small amount of the metal from the shank portion will be forced by the compressive forces to flow toward the toe portion, thereby resulting in a thinning of the shank of the cutter.

Figure 6:
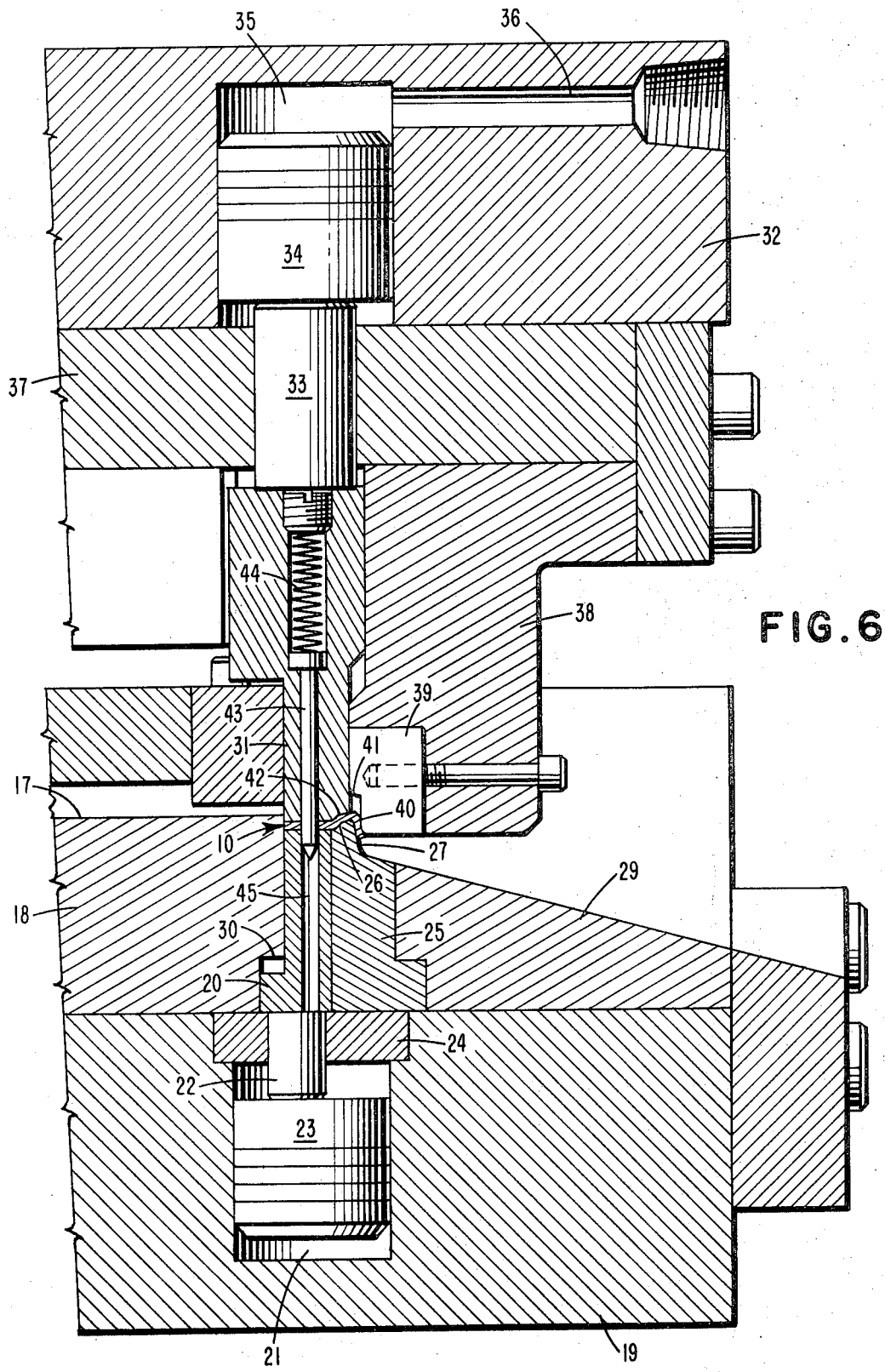
FIG. 6 is a sectional view corresponding to FIGS. 3–5 showing the upper clamp member partially collapsed.

FIG. 6 shows the die portion of FIGS. 3-5 with the second clamp member 31 partially collapsed and the carbide wiper block partially through its range of active motion so that the toe of the cutter is partially formed. The pressure urging plunger 32 towards platen 19 continues further to increase until the 4000 lbs. of force urging second clamp member 31 toward its extended position is exceeded so that the second clamp member begins to collapse toward its retracted position. The plunger continues its downward motion, and the carbide wiper block 39 which is fixedly attached to plunger 32 by means of plate 37 and support block 38 contacts the toe portion of blank 10 forcing the metal around anvil corner 28 and along the second anvil surface 27. Due to the great pressure applied by the press and the fact that the spacing between wiper surface 40 on wiper block 39 and the second anvil surface 27 on anvil 25 is less than the thickness of the stock material from which blank 10 was made, the metal of the toe portion of the blank is made to flow around corner 28 and along surface 27 under the influence of the applied compressive forces to form a narrowed and elongated toe on the cutter link.

Figure 7:
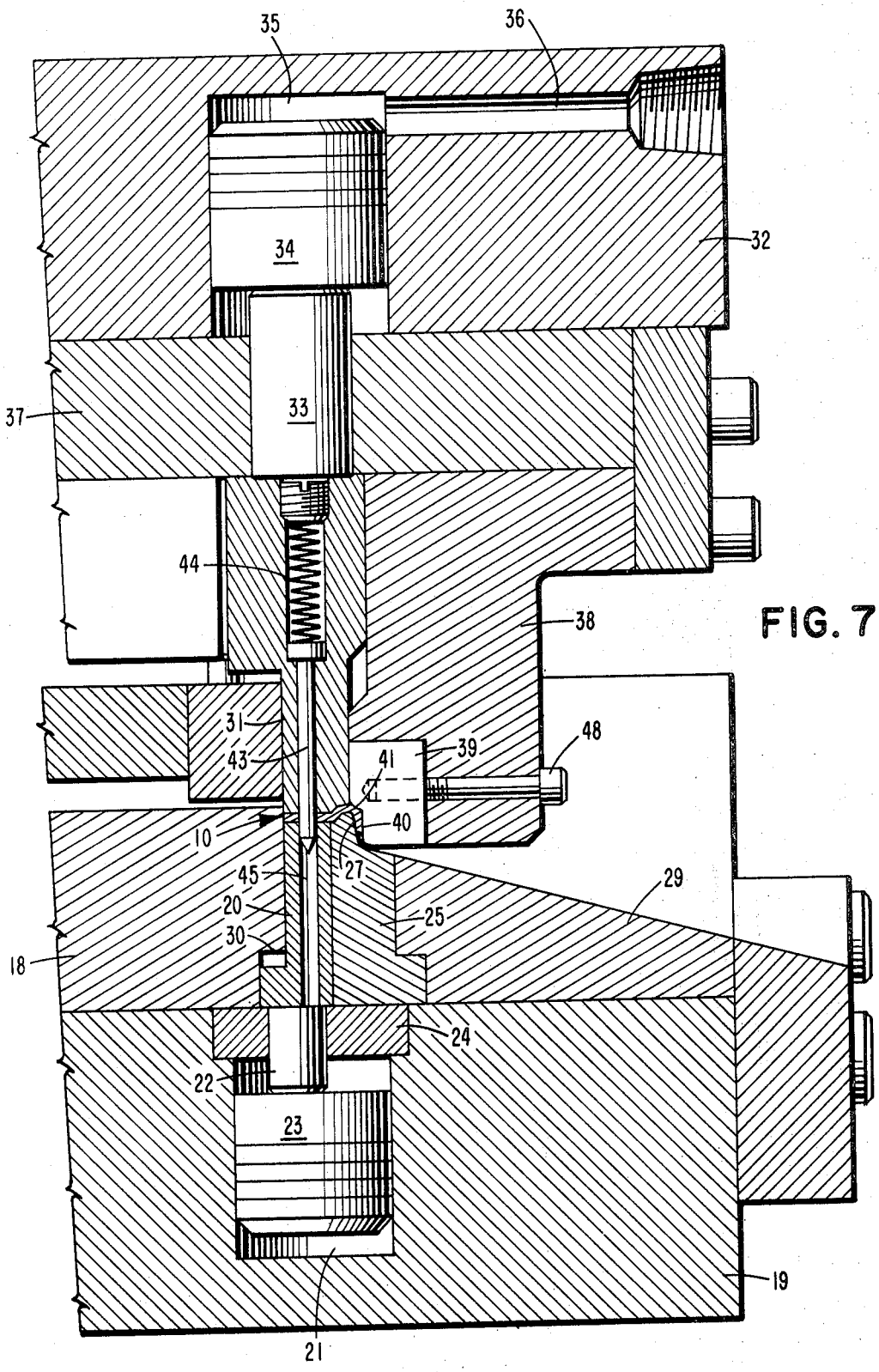
FIG. 7 is a sectional view corresponding to FIGS. 3–6 showing the die in closed position.

FIG. 7 shows the die portion of FIGS. 3-6 in fully closed position with both clamping members fully collapsed and the wiper 39 fully down on anvil 25 and with a chamfer formed on the cutter at the vertex between the shank and toe. The force urging the plunger 32 toward platen 19 continues until the second clamp member 31 is completely collapsed and the toe portion of blank 10 has been wiped along second anvil surface 27. Just as wiper block 39 reaches the limit of its movement, surface 41 strikes the vertex between the shank and toe of the cutter to form it to the desired configuration and to introduce additional compressive stresses thereto. Preferably striking surface 41 is slightly convex so that a concave chamfer is formed on the finished cutter. However, thoroughly useful cutters may be produced using a flat or a concave striking surface to form the cutter vertex. If a chamfer type cutter is formed, it has been found that the most efficient cutters are produced when the chamfer is formed at an angle with respect to the body portion of the cutter lying in the range of from 33° to 38°. The distance between forming surface 42 on clamp member 31 and striking surface 41 on wiper block 39 is exactly equal to the distance between the upper surface of clamp member 31 and plate 37 so that when the second clamp member 31 is fully collapsed, striking surface 41 and forming surface 42 form a smooth, even surface on the completed cutter. As a result of the block struck to the vertex of the cutter by striking surface 41, the vertex may be somewhat thinner than the body of the cutter. The strength of the vertex remains excellent due to the compressive stresses introduced by the block, despite the decrease in thickness.

Most preferably anvil 25 is contiguous with the first clamping member 20. Similarly wiper block 39 is preferably immediately adjacent the second clamping member. However, some spacing between the members may be acceptable in certain instances, particularly between the wiper block and the second clamping member. In the most preferred arrangement, the break or plane of contact between the anvil and the first clamping member intersects the cutter being formed at the point where the curvature of the laterally offset shank commences. Likewise the break or plane of contact between the wiper block and the second clamping member intersects the cutter being formed where the curvature of the vertex region between the shank and toe commences. These points have been found desirable for producing of uniform cutters. Depending on the requirements for the chain in which the cutters are to be used, slight variations may be acceptable.

The die may be advantageously provided with means for ejecting the formed cutter link when the die is opened. Such means might comprise means for automatically extending the lower clamp member as the die is opened coupled with means 50 for forcing a stream of compressed air against the formed cutter to expell it from the die illustrated schematically in FIG. 11.

Figure 13:
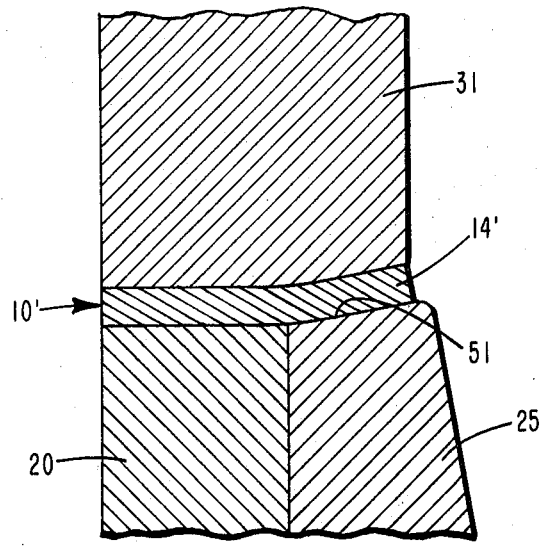
FIG. 13 is an enlarged sectional view of a cutter blank between the clamping members and the anvil illustrating the deflection of the depth gauge portion out of the plane of the body portion of the cutter link.

In the preferred embodiment of the process of the invention as illustrated in FIG. 13 anvil 25 is provided with a third anvil surface 51 disposed laterally adjacent the depth gauge portion of blank 10. As the first clamp member collapses, the depth gauge portion is struck against this third anvil surface in a like manner to the striking of the shank portion against the first anvil surface and simultaneously therewith. The depth gauge is thereby deflected out of the plane of the body portion of the blank to provide for increased chip clearance in the finished cutter. Deflecting the depth gauge out of the plane of the body portion is optional however, since it is possible to produce a useful cutter by arranging the die so that the depth gauge portion of the blank is disposed in the free space and remains in the plane of the body portion.

Figure 8:
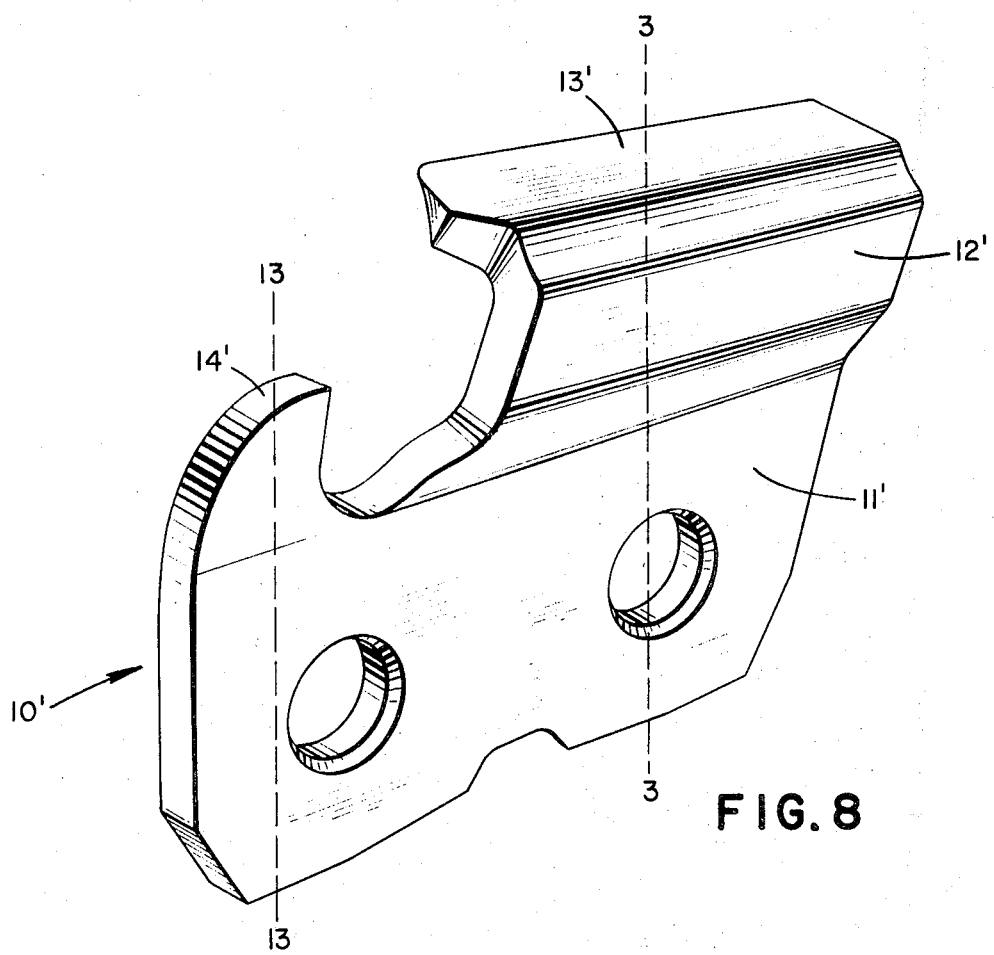
FIG. 8 is a perspective view of a preferred cutter link formed by the process of the invention prior to sharpening.
Figure 12:
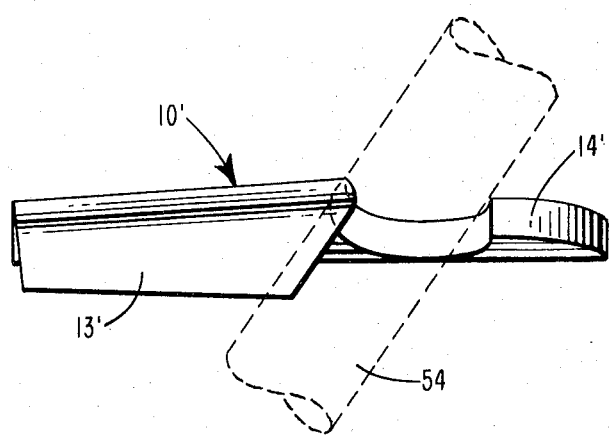
FIG. 12 is a top view of a formed cutter as shown in FIG. 8 illustrating how the cutter is sharpened.

FIG. 8 shows a perspective view of the finished cutter link except for sharpening. Cutter 10' has a body 11', a laterally offset shank 12' and a generally perpendicular toe 13'; as well as a laterally offset depth gauge 14'. The shank and toe of the cutter may be sharpened in the usual manner using a pencil grinding wheel or a round file 54 as illustrated in FIG. 12 to complete the cutter link. The completed link 10' may then be riveted together with appropriate drive links and connecting links to form a saw chain. FIG. 8 also includes reference lines 3—3 and 13—13 identifying the relative locations of the sectional views of FIGS. 3–7 and FIG. 13 respectively.

Figure 9:
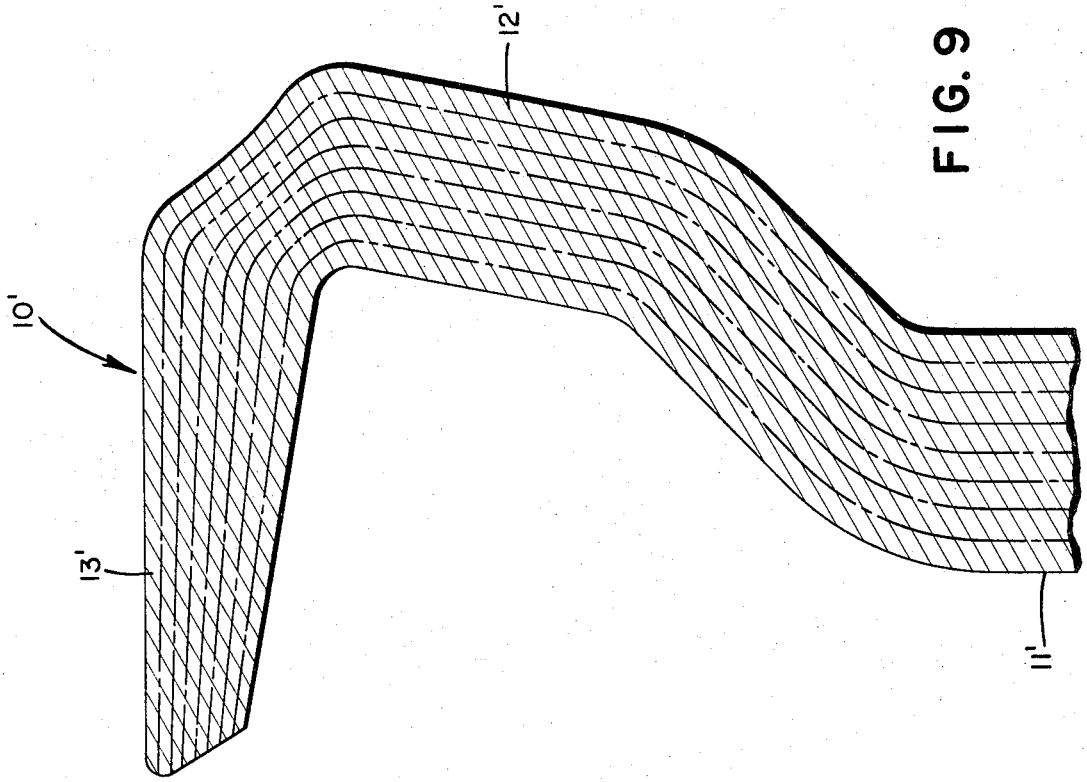
FIG. 9 is a transverse sectional view of the cutter shown in FIG. 8.
Figure 1:
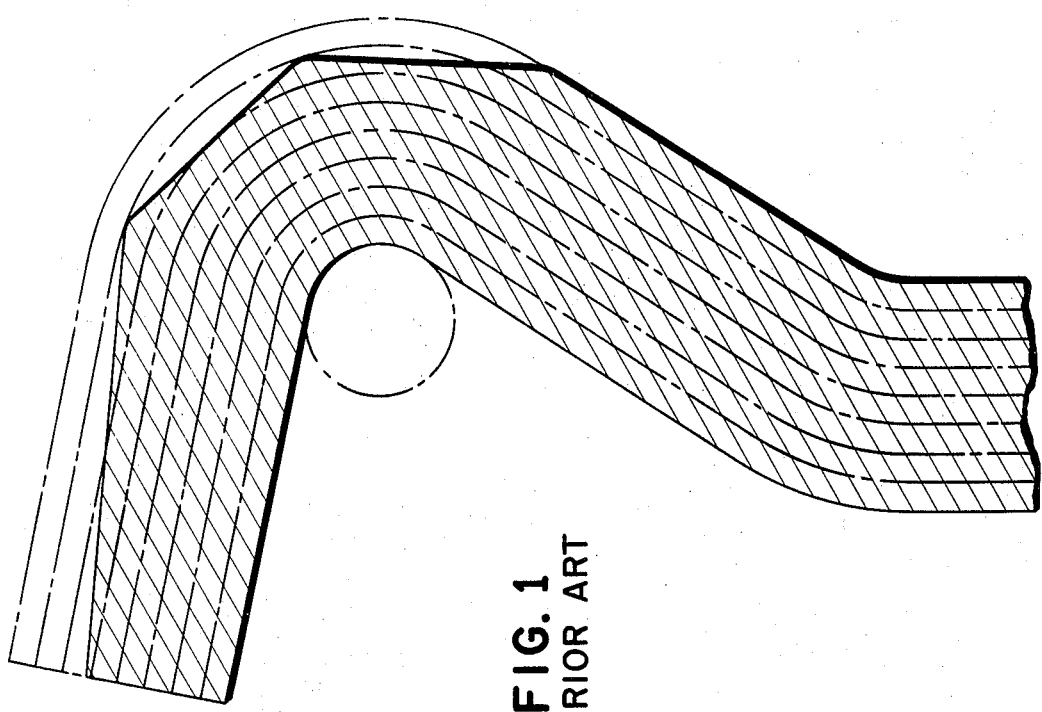
FIG. 1 is a transverse sectional view of a prior art, chamfer type semichisel cutter.

FIG. 9 shows a tranverse sectional view of a cutter formed by the process of the invention. Cutter 10' is of the chamfered semichisel type with a relatively sharp corner between the shank and toe which has a high cutting efficiency. Due to the lack of grinding, the material grain flow is uninterrupted. Furthermore, due to the compressive forces applied to the cutter between the first anvil surface 26 and the forming surface 42 and between the wiping surface 40 and the second anvil surface 27 and between the striking surface 41 and the anvil corner 28, the material tension along the outer surface of the cutter is minimized or eliminated altogether and replaced by compressive stress so that the resulting cutter has substantially greater fatigue and impact strength and correspondingly longer service life.

Figure 10:
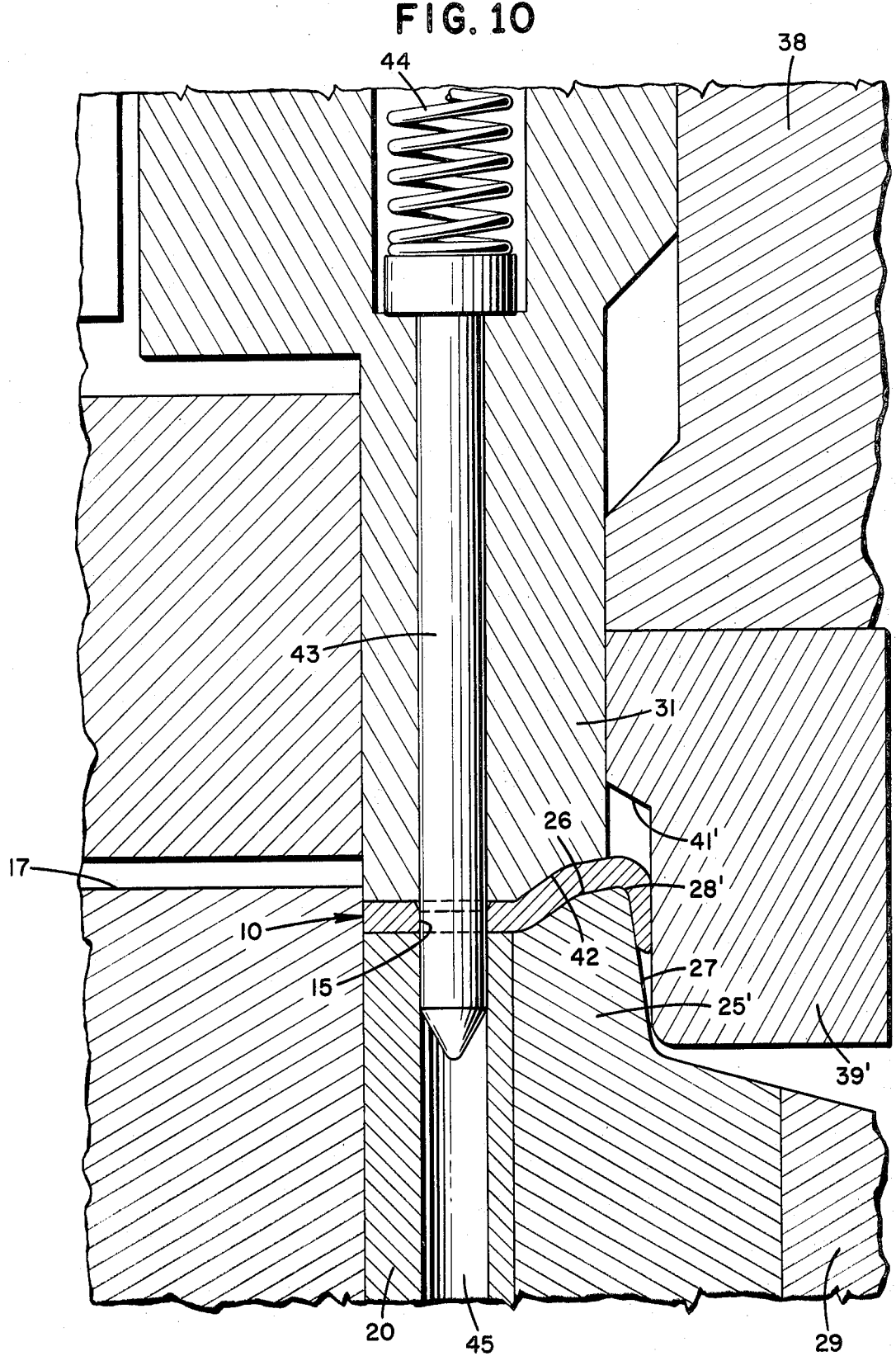
FIG. 10 is a detail section of a modified progressive die adapted for producing an alternate cutter according to the method of invention.

FIG. 10 is an expanded detail section of a modified die portion adapted to produce a slightly different cutter according to the process of the invention. The die and its operation upon the blank are identical to the form and operation of the die portion illustrated in FIGS. 3–7 in all respects except for the elimination of the striking surface from wiper block 39' and some modification of the configuration of anvil corner 28'. In the modified arrangement the wiper block is formed so that surface 41' does not contact the cutter blank and no forming blow is struck to the outer surface of the vertex between the shank and toe of the cutter. The configuration of the vertex may be controlled by adjusting the configuration of the anvil corner 28'. A highly satisfactory cutter has been produced when the anvil corner 28' is a segment of an ellipse as illustrated in FIG. 10. The resulting configuration of the outer surface of the vertex of the cutter is a smooth curve having no radius. Elimination of the striking surface from the wiper block 39' decreases the difficulty and expense of producing the wiper and somewhat increases the service life thereof.

The foregoing embodiments have been described merely as illustrative of the invention. Modifications and adaptations thereof will undoubtedly occur to those skilled in the art. For example the first clamping member and the anvil may be mounted on the plunger and the second anvil member and the wiper may be mounted on the platen of the press. Such modifications are contemplated within the scope of the invention. Therefore the scope of the invention is to be limited solely by the scope of the appended claims.

I claim:

1. A process for cold forming a saw chain cutter link having a flat body, a laterally offset shank and a generally perpendicular toe comprising the steps of:

producing a preformed, flat, metal blank comprising body, shank and toe portions generally corresponding to the body, shank and toe of the cutter to be formed;

clamping the body portion of the blank between movable clamping members with the shank and toe portions protruding from therebetween;

deflecting the shank portion out of the plane of the body portion by striking the shank portion against a first anvil surface disposed laterally adjacent thereto; said first anvil surface corresponding to the desired contour of the shank in the cutter being formed; and wiping the toe portion of the blank along a second anvil surface disposed adjacent said first surface; said second surface lying substantially perpendicular to the plane of the body portion.

2. A process as recited in claim 1 wherein said first and second anvil surfaces are formed on a single anvil disposed in a fixed position adjacent the blank.

3. A process as recited in claim 2 wherein the sectional configuration of said anvil between said first and second anvil surfaces is a circular arc.

4. A process as recited in claim 2 wherein the sectional configuration of said anvil between said first and second anvil surfaces is an eliptical curve.

5. A process as recited in claim 1 wherein said movable clamping members comprise first and second opposing members each adapted for reciprocable motion and provided with pressure applying means for urging said members toward each other.

6. A process as recited in claim 5 wherein the second clamping member is disposed on the opposite side of the blank from the first anvil surface and has a forming surface thereon disposed adjacent the shank portion of the blank; said forming surface corresponding to the desired outer contour of the shank in the cutter being formed, and wherein the shank portion is deflected against said forming surface when said shank portion is struck against said first anvil surface.

7. A process as recited in claim 5 wherein the means for urging the clamping members toward each other comprises a hydraulic accumulator operatively connected to each clamping member.

8. A process as recited in claim 5 wherein the means for urging the second clamping member toward the first clamping member comprises a hydraulic accumulator and said means for urging said first clamping member towards said second member comprises a compression spring.

9. A process as recited in claim 5 wherein movement of said clamping members laterally with respect to a blank therebetween is effected by applying greater pressure to said second clamping member than to said first clamping member.

10. A process as recited in claim 9 wherein the force applied to said second clamping member is double the force applied to said first clamping member.

11. A process as recited in claim 9 wherein the difference in force applied to said first and second clamping members is greater than about 1000 lb.

12. A process as recited in claim 11 wherein the difference in force applied to said first and second members is 2000 lb.

13. A process as recited in claim 1 wherein the step of wiping the toe portion of the blank along the second anvil surface is effected by wiping means disposed adjacent said second clamping member and adapted for motion generally perpendicular to the plane of the body portion of the blank.

14. A process as recited in claim 13 wherein said wiping means comprises a carbide wiping block mounted on the plunger of a press die.

15. A process as recited in claim 13 wherein said wiper means is contiguous with said second clamping member.

16. A process as recited in claim 15 wherein the plane of contact between said wiping means and said second clamping means intersects the cutter being formed at the point of commencement of curvature of the vertex region between the shank and toe.

17. A process as recited in claim 1 wherein said movable clamping members comprise first and second opposing members each adapted for independent reciprocable motion and provided with pressure applying means for urging said member toward the other, and wherein said first and second anvil surface are formed on a single anvil disposed in a fixed position adjacent said blank.

18. A process as recited in claim 17 wherein said anvil is contiguous with said first clamping member.

19. A process as recited in claim 18 wherein the plane of contact between said anvil and said first clamping member intersects the cutter being formed at the point of commencement of curvature of the laterally offset shank.

20. A process as recited in claim 1 further comprising the step of striking the cutter at the vertex between the shank and toe to form the vertex to a desired configuration.

21. A process as recited in claim 20 wherein the vertex of the cutter is formed thinner than the body of the cutter.

22. A process as recited in claim 20 wherein the vertex is formed to a chamfer configuration.

23. A process as recited in claim 22 wherein said chamfer configuration is concave.

24. A process as recited in claim 22 wherein said chamfer is formed at an angle lying in the range of from 33° to 33° with respect to the plane of the body portion.

25. A process as recited in claim 1 wherein said link further comprises an integral depth gauge portion.

26. A process according to claim 25 wherein the depth gauge portion is deflected simultaneously with the shank portion out of the plane of the body portion by striking the depth gauge portion against a third anvil surface disposed adjacent thereto, said third surface corresponding to the desired contour of the depth gauge in the cutter being formed.

27. A process as recited in claim 1 further comprising the step of sharpening the cutter.

28. A process as recited in claim 1 further comprising the step of forcing a stream of compressed Air against the formed cutter link to eject it from the forming apparatus.

29. A process as recited in claim 1 wherein a pair of locator pins is associated with one of said movable clamping members to facilitate proper positioning of said blank.

* * * * *

UNITED STATES PATENT OFFICE
CERTIFICATE OF CORRECTION

Patent No. 3,837,241                    Dated September 24, 1974

Inventor(s)  Werner Weiss

It is certified that error appears in the above-identified patent and that said Letters Patent are hereby corrected as shown below:

Page 1, Abstract, line 2, after "in" (first occurrence) insert -- a --.

Column 5, line 27, after "lower" insert -- clamp --; line 41, after "against" insert -- forming --.

Column 6, line 34, instead of "block" read -- blow --; line 38, instead of "block" read -- blow --.

Claim 24, line 3, instead of "33°" (second occurrence) read -- 38° --.

Signed and sealed this 3rd day of December 1974.

(SEAL)
Attest:

McCOY M. GIBSON JR.                C. MARSHALL DANN
Attesting Officer                  Commissioner of Patents